US008076246B2

(12) United States Patent
Tanaka et al.

(10) Patent No.: US 8,076,246 B2
(45) Date of Patent: Dec. 13, 2011

(54) METHOD OF MANUFACTURING THERMALLY ASSISTED MAGNETIC HEAD

(75) Inventors: Kosuke Tanaka, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 411 days.

(21) Appl. No.: 12/359,508

(22) Filed: Jan. 26, 2009

(65) Prior Publication Data
US 2009/0188891 A1 Jul. 30, 2009

(30) Foreign Application Priority Data

Jan. 29, 2008 (JP) .................................. 2008-018242

(51) Int. Cl.
H01L 21/64 (2006.01)

(52) U.S. Cl. .......... 438/692; 438/31; 438/691; 438/694; 385/129; 385/130; 385/131; 385/132; 216/24; 216/89; 216/95

(58) Field of Classification Search .................. None
See application file for complete search history.

(56) References Cited

U.S. PATENT DOCUMENTS

| 6,949,392 | B2 * | 9/2005 | Gill et al. .......................... 438/31 |
| 2002/0092824 | A1 * | 7/2002 | Sun et al. .......................... 216/24 |
| 2005/0190496 | A1 * | 9/2005 | Hamann et al. ................ 360/128 |
| 2006/0132983 | A1 * | 6/2006 | Osugi et al. .................... 360/313 |
| 2008/0145524 | A1 * | 6/2008 | Guthrie et al. ................. 427/131 |
| 2008/0310808 | A1 * | 12/2008 | Fried et al. ...................... 385/129 |

FOREIGN PATENT DOCUMENTS
JP A-2007-257753 10/2007
* cited by examiner

Primary Examiner — Lan Vinh
Assistant Examiner — Jiong-Ping Lu
(74) Attorney, Agent, or Firm — Oliff & Berridge, PLC

(57) ABSTRACT

A method comprises a first multilayer body forming step of forming a first multilayer body on a first cladding layer, the first multilayer body including a core layer and a first polishing stop layer in order from the first cladding layer side; a first multilayer body patterning step of pattering the first multilayer body, so as to expose the first cladding layer about the patterned first multilayer body; a second multilayer body forming step of forming a second multilayer body on the exposed first cladding layer and patterned first multilayer body, the second multilayer body including a second cladding layer and a second polishing stop layer in order from the first cladding layer side; and a removing step of polishing away a part of the second multilayer body formed on the first multilayer body.

4 Claims, 9 Drawing Sheets (A)

(B)

(A)

(B)

(A)

(B)

METHOD OF MANUFACTURING THERMALLY ASSISTED MAGNETIC HEAD

BACKGROUND OF THE INVENTION

1. Field of the Invention

The present invention relates to a method of manufacturing a thermally assisted magnetic head which enables high-density recording.

2. Related Background Art

As a means for achieving higher recording density in hard disk drives, a so-called thermally assisted magnetic recording scheme has been proposed, which uses a magnetic material having large $K_U$ as a recording medium, while heat is applied to the recording medium immediately before exerting a writing magnetic field, so as to effect writing with a lower coercivity.

Known as a thermally assisted magnetic head used in such a thermally assisted magnetic recording scheme is one in which a core layer and a cladding layer surrounding the core layer are provided within a slider, an electromagnetic coil device is laminated on the cladding layer, and a plasmon probe is provided on a medium-opposing surface of the core layer as in Japanese Patent Application Laid-Open No. 2007-257753. Near-field light generated from the plasmon probe when light is supplied to the core layer and a magnetic field generated from a magnetic pole of the electromagnetic coil device perform writing to a medium.

SUMMARY OF THE INVENTION

For fully enhancing the writing capability in the thermally assisted magnetic head such as the one mentioned above, it is necessary for the core layer and the magnetic pole of the electromagnetic coil device to be positioned sufficiently close to each other as seen from the medium-opposing surface. However, it is difficult for the core layer and the magnetic pole to be positioned sufficiently close to each other when the cladding layer surrounding the core layer is formed and flattened while the electromagnetic coil device is simply formed on the flattened surface of the cladding layer as conventionally done. This is because the polishing of the cladding layer on the core layer is hard to stop immediately in front of the core layer, whereby there are fears of the core layer being polished when attempting to make the cladding layer sufficiently thin on the core layer, and the thickness of the cladding layer, i.e., the distance between the core layer and magnetic pole, fluctuating greatly among the devices.

In view of the problem mentioned above, it is an object of the present invention to provide a method of manufacturing a thermally assisted magnetic head which can place the core and the magnetic pole closer to each other and easily control the distance between the core and magnetic pole such as to make it fall within a predetermined range.

The method of manufacturing a thermally assisted magnetic head in accordance with the present invention comprises a first multilayer body forming step of forming a first multilayer body on a first cladding layer, the first multilayer body including a core layer and a first polishing stop layer in order from the first cladding layer side; a first multilayer body patterning step of patterning the first multilayer body, so as to expose the first cladding layer about the patterned first multilayer body; a second multilayer body forming step of forming a second multilayer body on the exposed first cladding layer and patterned first multilayer body, the second multilayer body including a second cladding layer and a second polishing stop layer in order from the first cladding layer side; and a removing step of polishing away a part of the second multilayer body formed on the first multilayer body.

Since the part of the second multilayer body formed on the first multilayer body (also referred to as projected part of the second multilayer body in the following) relatively projects from the part of the second multilayer body formed about the first multilayer body at the time of executing the removing step in the present invention, the projected part of the second multilayer body is easily removed by the removing step. When polishing the projected part of the second multilayer body, the first polishing stop layer in the first multilayer body restrains the core layer from being polished. This makes it easy for the thickness of the second cladding layer on the core layer to become zero without polishing the core layer. Even when forming a number of devices at once, the thickness of each second cladding layer can easily be made zero without polishing the core layers. At the time of polishing, the part of the second cladding layer located about the core layer is covered with the second polishing stop layer and thus can be restrained from being polished unnecessarily, whereby its thickness can easily be kept at a desirable thickness. Therefore, after the removing step, a relatively flat third cladding layer can be formed with a predetermined minute thickness on the core layer and the second cladding layer located thereabout without further polishing steps. Forming a magnetic pole on the third cladding layer can make the distance between the core and magnetic pole shorter. Also, even when the same step is simultaneously performed for a plurality of heads, the distance between the core and magnetic pole can be controlled so as to fall within a predetermined range among the plurality of heads.

Preferably, in the second multilayer body forming step, the second cladding layer has a thickness not smaller than that of the core layer in the first multilayer body.

This allows the lower face of the second polishing stop layer to have a height not lower than the upper face of the second polishing stop layer, whereby the second polishing stop layer also restrains the core layer from being polished.

Preferably, after the removing step, the method further comprises the step of removing the first and second polishing stop layers and forming a third cladding layer on the core layer and second cladding layer.

This makes it easy to flatten the surface of the third cladding layer without polishing.

The present invention provides a method of manufacturing a thermally assisted magnetic head which can place the core and the magnetic pole closer to each other and easily control the distance between the core and magnetic pole such as to make it fall within a predetermined range.

BRIEF DESCRIPTION OF THE DRAWINGS

for explaining the method of manufacturing a thermally assisted magnetic head, whereas

DESCRIPTION OF THE PREFERRED EMBODIMENTS

Figure 1:
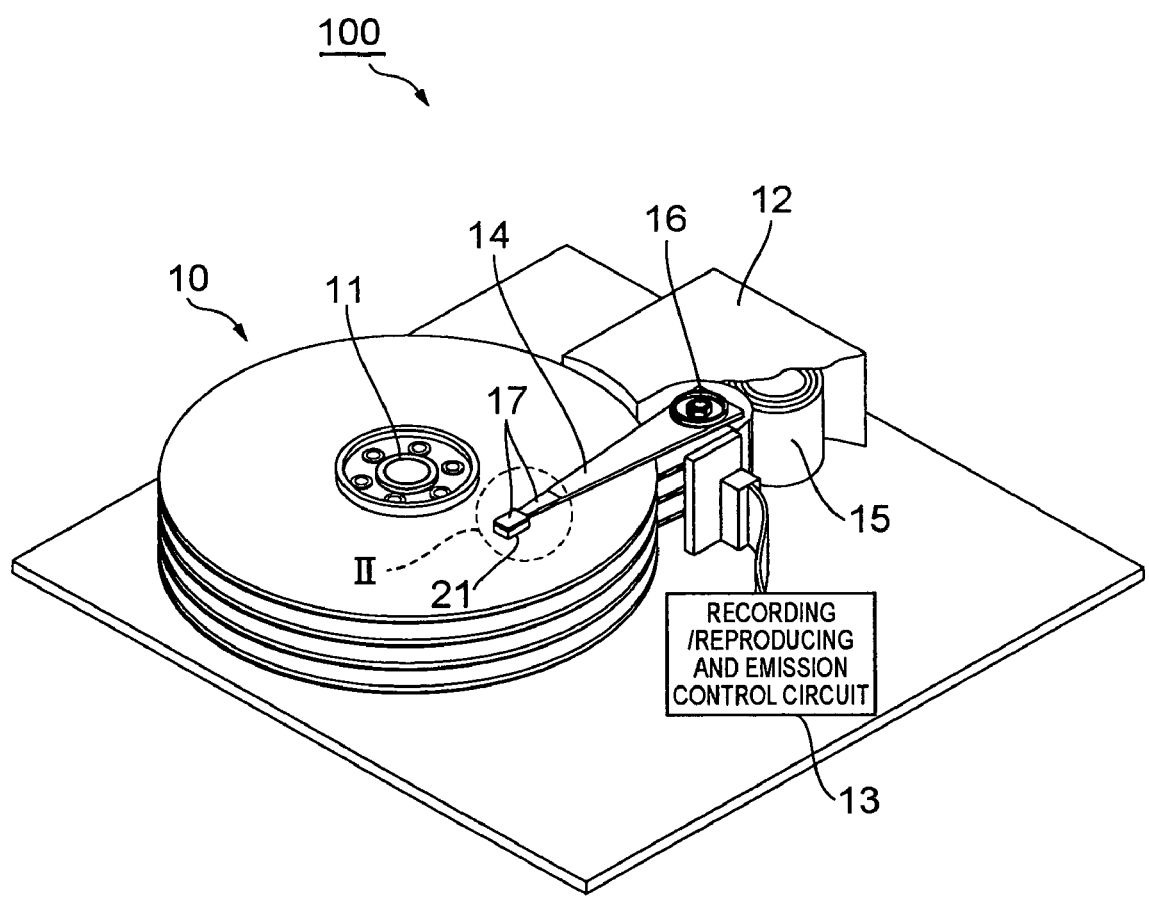
FIG. 1 is a perspective view of the hard disk drive in accordance with an embodiment.

Modes for carrying out the present invention will now be explained in detail with reference to the accompanying drawings. In the drawings, the same elements are referred to with the same numerals. For easier viewing of the drawings, ratios of sizes within and between constituents therein are arbitrary.

Hard Disk Drive

FIG. 1 is a perspective view of a hard disk drive in accordance with an embodiment.

This hard disk drive 1 comprises magnetic disks which are a plurality of magnetic recording media rotating about a rotary shaft of a spindle motor 11, an assembly carriage device 12 for positioning a thermally assisted magnetic head 21 on a track, and a read/write control circuit 13 for controlling writing and reading actions of the thermally assisted magnetic head 21 and regulating a laser diode acting as a light source for generating laser light for thermally assisted magnetic recording which will later be explained in detail.

The assembly cage device 12 is provided with a plurality of driving arms 14. These driving arms 14 can be swung about a pivot bearing shaft 16 by a voice coil motor (VCM) 15 and are stacked in a direction along the shaft 16. A head gimbal assembly (HGA) 17 is attached to a leading end part of each driving arm 14. In each HGA 17, the thermally assisted magnetic head 21 is provided such as to oppose the front face of its corresponding magnetic disk 10. The surface opposing the front face of the magnetic disk 10 is the medium-opposing surface S (also referred to as air bearing surface) of the thermally assisted magnetic head 21. The magnetic disk 10, driving arm 14, HGA 17, and thermally assisted magnetic head 21 may be provided singly as well.

HGA

Figure 2:
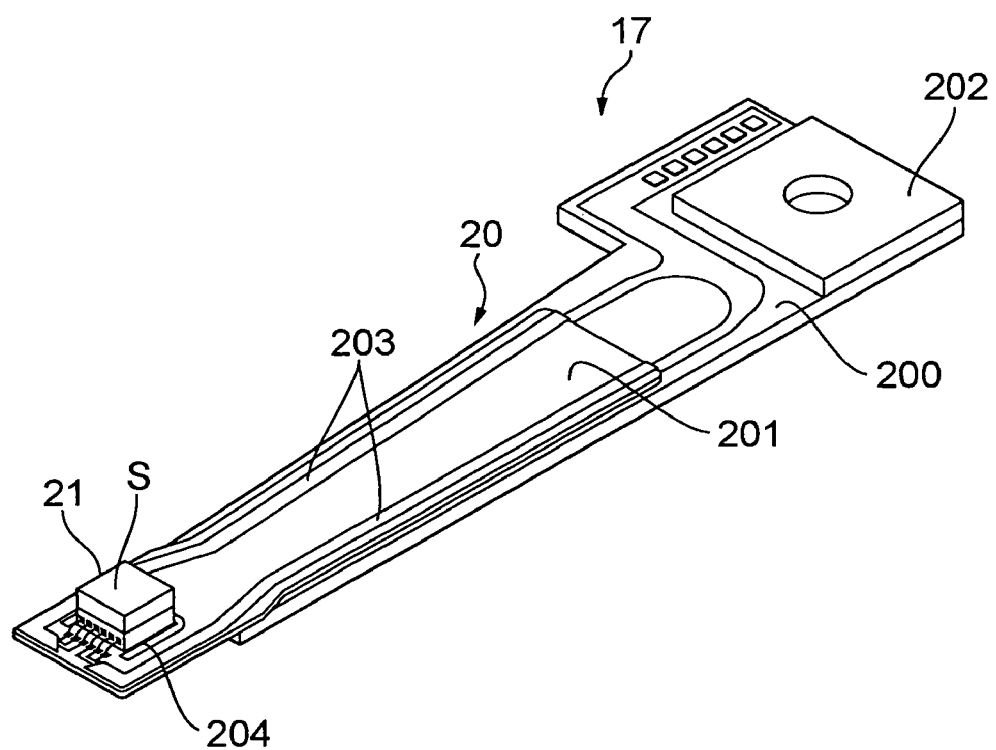
FIG. 2 is a perspective view of an HGA 17.

FIG. 2 is a perspective view of the HGA 17. This drawing shows the HGA 17 with its medium-opposing surface S facing up.

The HGA 17 is constructed by firmly attaching the thermally assisted magnetic head 21 to a leading end part of a suspension 20 and electrically connecting one end of a wiring member 203 to a terminal electrode of the thermally assisted magnetic head 21. The suspension 20 is mainly composed of a load beam 200, an elastic flexure 201 firmly attached onto and supported by the load beam 200, a tongue 204 formed like a leaf spring at the leading end of the flexure 201, a base plate 202 provided at a base part of the load beam 200, and the wiring member 203, which is provided on the flexure 201 and comprises lead conductors and connecting pads electrically connected to both ends of the lead conductors.

It is clear that the structure of suspension in the HGA 17 is not limited to that mentioned above. Though not depicted, an IC chip for driving the head may be mounted somewhere in the suspension 20.

Thermally Assisted Magnetic Head

Figure 3:
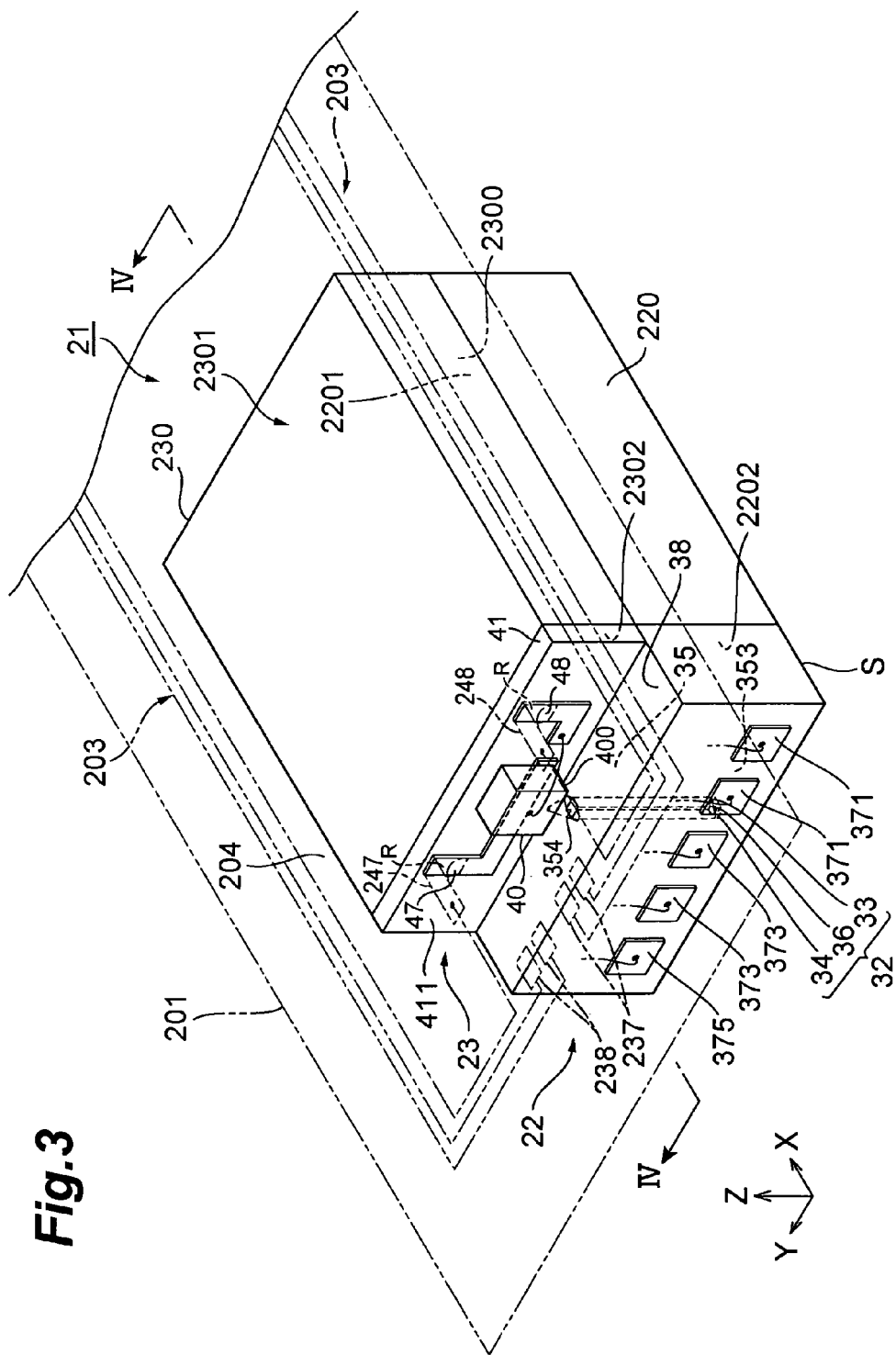
FIG. 3 is an enlarged perspective view of a thermally assisted magnetic head 21 and its vicinity shown in FIG. 1.
Figure 4:
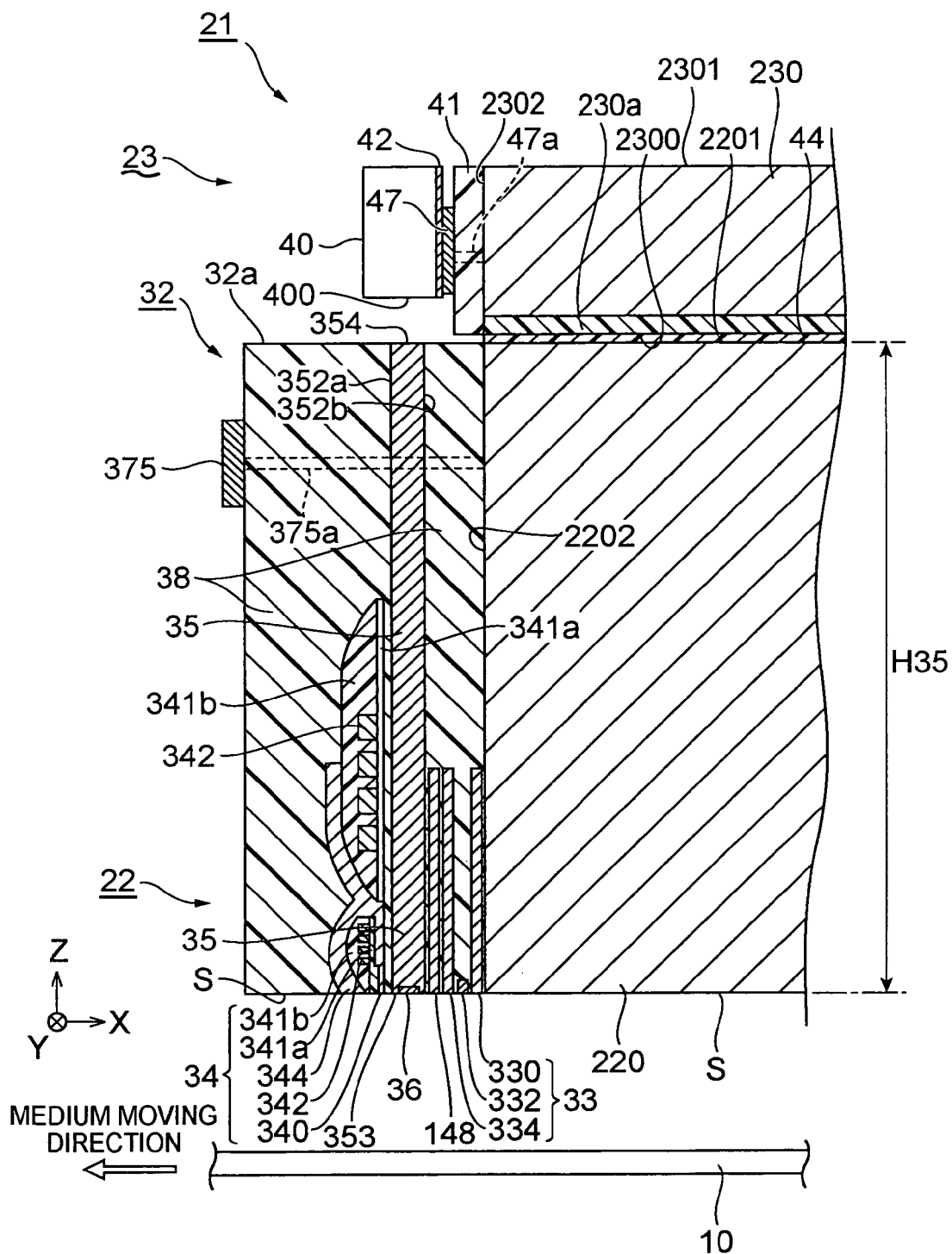
FIG. 4 is a sectional view of the thermally assisted magnetic head 21 taken along the line IV-IV of FIG. 3.

FIG. 3 is an enlarged perspective view of a thermally assisted magnetic bead 21 and its vicinity shown in FIG. 1. FIG. 4 is a sectional view of the thermally assisted magnetic head 21 taken along the line IV-IV of FIG. 3.

The thermally assisted magnetic head 21 is constructed such that a slider 22 and a light source unit 23 comprising a light source supporting substrate 230 and a laser diode 40 to become a light source for thermally assisted magnetic recording are secured together by bonding the rear face 2201 of a slider substrate 220 and a bonding surface 2300 of the light source supporting substrate 230 to each other. Here, the rear face 2201 of the slider substrate 220 is a surface of the slider 22 on the side opposite from the medium-opposing surface S. The bottom face 2301 of the light source supporting substrate 230 is bonded to the tongue 204 of the flexure 201 by an adhesive such as epoxy resin, for example.

Slider

The slider 22 comprises the slider substrate 220 and a magnetic head part 32 for writing and reading data signals.

The slider substrate 220 has a planar form and includes the medium-opposing surface S processed such as to yield an appropriate fly height. The slider substrate 220 is formed from conductive AlTiC ($Al_2O_3$—TiC), for example.

As shown in FIGS. 3 and 4, the magnetic head part 32 is formed on an integration surface 2202 which is a side face substantially perpendicular to the medium-opposing surface S of the slider substrate 220. The magnetic head part 32 comprises an MR device 33 as a magnetization detecting device for detecting magnetic information, an electromagnetic device 34 as a perpendicular (or in-plane) magnetic recording device for writing magnetic information by generating a magnetic field, a core layer 35 as a core of a planar waveguide provided such as to pass between the M device 33 and electromagnetic coil device 34, a near-field light generating part (also referred to as plasmon probe) 36 for generating near-field light for heating a recording layer part of the magnetic disk, and an insulating layer 38 functioning as a cladding layer formed on the integration surface 2202 such as to cover the MR device 33, electromagnetic coil device 34, core layer 35, and near-field light generating part 36.

As shown in FIG. 3, the magnetic head part 32 further comprises a pair of electrode pads 371, 371 for signal terminals formed on the exposed surface of the insulating layer 38 and connected to respective I/O terminals of the MR device 33, a pair of electrode pads 373, 373 for signal terminals connected to respective ends of the electromagnetic coil device 34, and a grounding electrode pad 375 electrically connected to the slider substrate 220. As shown in FIG. 4, the electrode pad 375 electrically connected to the slider substrate 220 through a via hole 375a is connected to an electrode pad 247 of the flexure 201 by a bonding wire, whereby the potential of the slider substrate 220 is regulated to the ground potential, for example, by the electrode pad 247.

Respective end faces of the MR device 33, electromagnetic coil device 34, and near-field light generating part 36 are exposed at the medium-opposing surface S.

As shown in FIG. 4, the MR device 33 includes an MR multilayer body 332, and a lower shield layer 330 and an upper shield layer 334 which are arranged at respective positions holding the MR multilayer body 332 therebetween. Each of the lower shield layer 330 and upper shield layer 334 can be constructed by a magnetic material such as NiFe, CoFeNi, CoFe, FeN, or FeZrN having a thickness on the order of 0.5 to 3 μm formed by pattern plating including frame plating or the like, for example. The lower and upper shield layers 330 and 334 prevent the MR multilayer body 332 from being affected by external magnetic fields which may cause noises.

The MR multilayer body 332 includes a magnetoresistive film such as current-in-plane (CIP) giant magnetoresistive (GMR) multilayer film, current-perpendicular-to-plane (CPP) GMR multilayer film or tunneling magnetoresistive (TMR) multilayer film, and senses signal magnetic fields from the magnetic disk with a very high sensitivity.

The MR multilayer body 332 including a TMR multilayer film, for example, has a structure formed by successively laminating an antiferromagnetic layer having a thickness on the order of 5 to 15 nm made of IrMn, PtMn, NiMn, RuRhMn, or the like; a magnetization pinned layer which is constituted by a ferromagnetic material such as CoFe or two layers of CoFe or the like holding therebetween a nonmagnetic metal layer such as Ru, for example, and has a direction of magnetization fixed by the antiferromagnetic layer; a tunnel barrier layer made of a nonmagnetic dielectric material formed when a metal film having a thickness on the order of 0.5 to 1 nm made of Al, AlCu, or the like is oxidized naturally or by oxygen introduced into a vacuum apparatus, for example; and a free magnetization layer which is constituted by a two-layer film made of CoFe or the like having a thickness of about 1 nm and NiFe or the like having a thickness on the order of 3 to 4 nm which are ferromagnetic materials, for example, and forms a tunneling exchange coupling with the magnetization pinned layer through the tunnel barrier layer.

An interdevice shield layer 148 made of a material similar to that of the lower shield layer 330 is formed between the MR device 33 and core layer 35. The interdevice shield layer 148 acts to shield the MR device 33 from magnetic fields generated from the electromagnetic coil device 34, thereby preventing external noises from occurring at the time of reading.

The insulating layer 38 made of alumina or the like is formed between the shield layers 330, 334 on the side of the MR multilayer body 332 opposite from the medium-opposing surface S, on the shield layers 330, 334, 148 on the side opposite from the medium-opposing surface S, between the lower shield layer 330 and slider substrate 220, and between the interdevice shield layer 148 and core layer 35.

When the MR multilayer body 332 includes a CIP-GMR multilayer film, upper and lower shield gap layers for insulation made of alumina or the like are provided between the MR multilayer body 332 and the upper and lower shield layers 334, 330, respectively. Further, though not depicted, an MR lead conductor layer for supplying the MR multilayer body 332 with a sense current and taking out a reproduced output is formed. When the NR multilayer body 332 includes a CPP-GMR multilayer film or TMR multilayer film, on the other hand, the upper and lower shield layers 334, 330 also function as upper and lower electrode layers, respectively. In this case, the upper and lower shield gap layers and MR lead conductor layer are unnecessary and omitted.

Formed on both sides in the track width direction of the MR multilayer body 332 are hard bias layers (not depicted) made of a ferromagnetic material such as CoTa, CoCrPt, or CoPt for applying a longitudinal bias magnetic field for stabilizing magnetic domains.

The electromagnetic coil device 34, which is preferably one for perpendicular magnetic recording, comprises a main magnetic pole layer 340, a gap layer 341a, a coil insulating layer 341b, a coil layer 342, and an auxiliary magnetic pole layer 344 as shown in FIG. 4.

The main magnetic pole layer 340 is a magnetoconductive path for guiding the magnetic flux induced by the coil layer 342 to the recording layer of a magnetic disk (medium) to be written while converging it. Preferably, the end part of the main magnetic pole layer 340 on the medium-opposing surface S side has a width in the track width direction (sheet thickness direction of FIG. 4) and a thickness in the laminating direction horizontal direction of FIG. 4) which are smaller than those of the remaining part. As a result, a fine, strong writing magnetic field suitable for a higher recording density can be generated.

The end part on the medium-opposing surface S side of the auxiliary magnetic pole layer 344 magnetically coupled to the main magnetic pole layer 340 forms a trailing shield part having a layer cross section wider than that in the remaining part of the auxiliary magnetic pole layer 344. The auxiliary magnetic pole layer 344 opposes the end part on the medium-opposing surface S side of the main magnetic pole layer 340 through the gap layer 341a and coil insulating layer 341b formed by an insulating material such as alumina.

The auxiliary magnetic pole layer 344 is constituted by an alloy made of two or three of Ni, Fe, and Co formed by frame plating, sputtering, or the like, for example, an alloy mainly composed of them and doped with a predetermined element, or the like having a thickness of about 0.5 to about 5 µm, for example.

The gap layer 341a, which separates the coil layer 342 and main magnetic pole layer 340 from each other, is constituted by $Al_2O_3$, DLC, or the like formed by sputtering, CVD, or the like, for example, having a thickness of about 0.01 to about 0.5 µm, for example.

The coil layer 342 is constituted by Cu or the like formed by frame plating or the like, for example, having a thickness of about 0.5 to about 3 µm, for example. The rear end of the main magnetic pole layer 340 and the part of the auxiliary magnetic pole layer 344 remote from the medium-opposing surface S are joined to each other, while the coil layer 342 is formed such as to surround this joint. The coil layer 342 is a single layer in FIG. 4 and the like, but may be constituted by two or more layers or a helical coil.

The coil insulating layer 341b, which separates the coil layer 342 and auxiliary magnetic pole layer 34 from each other, is constituted by an electrically insulating material such as a thermally cured alumina or resist layer having a thickness of about 0.1 to about 5 µm, for example.

Figure 5:
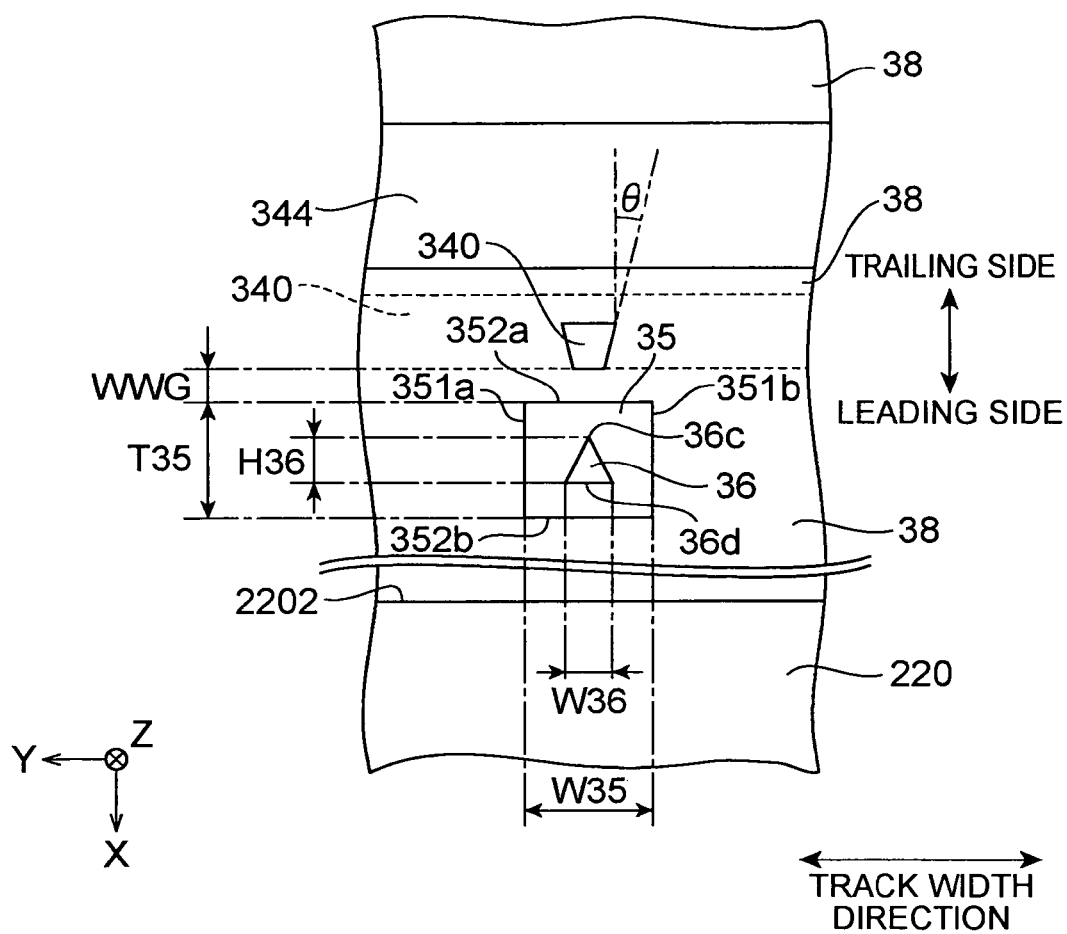
FIG. 5 is a plan view of a main part of the magnetic head as seen from its medium-opposing surface side.

FIG. 5 is a plan view of a main part of the magnetic head as seen from the medium-opposing surface side.

The leading end of the main magnetic pole layer 340 on the medium-opposing surface S side is tapered such as to yield an inverted trapezoidal form whose side on the leading side, i.e., on the slider substrate 220 side, is shorter than that on the trailing side.

The end face of the main magnetic pole layer 340 on the medium-opposing surface side is provided with a bevel angle θ so as not to cause unnecessary writing and the like onto adjacent tracks under the influence of skew angles generated by driving with a rotary actuator. The bevel angle θ is about 15°, for example. In practice, writing magnetic fields mainly occur in the vicinity of the longer side on the trailing side. In the case of the magnetic dominant recording, the length of the longer side determines the width of the writing track.

Preferably, the main magnetic pole layer 340 is constituted by an alloy composed of two or three of Ni, Fe, and Co, an alloy mainly composed of them and doped with a predetermined element or the like having a total thickness of about 0.01 to about 0.5 µm at an end part on the medium-opposing surface S side and that of about 0.5 to about 3.0 µm in the remaining part, for example, formed by frame plating, sputtering, or the like, for example. The track width may be 100 nm, for example.

As shown in FIG. 4, the core layer 35 is positioned between the MR device 33 and electromagnetic coil device 34 and extends parallel to the integration surface 2202 from the medium-opposing surface S of the magnetic head part 32 to the surface 32a of the magnetic head part 32 opposite from the medium-opposing surface S, while having a rectangular planar form in this embodiment. Of the core layer 35, as show in FIG. 5, two side faces 351a, 351b opposing each other in the track width direction and two side faces 352a, 352b parallel to the integration surface 2202 are in contact with the insulating layer 38, which has a refractive index lower than the core layer 35 and functions as a cladding layer with respect to the core layer 35 acting as a core.

Returning to FIG. 4 and assuming that X, Y, and Z axes are the thickness direction, width direction, and longitudinal direction (direction perpendicular to the medium) of the core layer 35, the light emitted along the Z axis from the light-emitting surface of the laser diode 40 is incident on a light entrance surface 354. The core layer 35 can guide the light incident on the light entrance surface 354 to a light emitted surface 353 which is an end face on the medium-opposing surface S side, while reflecting the light by its side faces. The width W35 in the track width direction of the core layer 35 shown in FIG. 5 may be 0.05 to 200 µm, for example, preferably 0.05 to 10 µm. The thickness T35 may be 0.5 to 10 µm, for example, while the height 1135 shown in FIG. 4 may be 10 to 300 µm. In particular, the distance WWG between the main magnetic pole layer 340 and core layer 35 as seen from the medium-opposing surface (see FIG. 5) is preferably 0.05 to 0.5 µm in this embodiment.

The core layer 35 is constituted by a dielectric material, formed by using sputtering or the like, for example, having a refractive index n higher than that of the material forming the insulating layer 38 in any part. When the insulating layer 38 acting as the cladding is formed from $SiO_2$ (n=1.5), for example, the core layer 35 may be formed from $Al_2O_3$ (n=1.63). When the insulating layer 38 is formed from $Al_2O_3$ (n=1.63), the core layer 35 may be formed from $Ta_2O_5$ (n=2.16), $Nb_2O_5$ (n=2.33), TiO (n=2.3 to 2.55), or $TiO_2$ (n 2.3 to 2.55). When the core layer 35 is constituted by such a material, the propagation loss of laser light is reduced not only by favorable optical characteristics of the material itself but also by the fact that a total reflection condition is satisfied at interfaces, whereby the efficiency at which the near-field light is generated improves.

As shown in FIG. 5, the near-field light generating part 36 is a planar member arranged on the light exit surface 353 of the core layer 35. As shown in FIG. 4, the near-field light generating part 36 is buried in the light exit surface 353 of the core layer 35 such as to expose its end face at the medium-opposing surface S. As shown in FIG. 5, the near-field light generating part 36 has a triangular form as seen from the medium-opposing surface S and is formed from a conductive material. Examples of the conductive material include metals such as Au and alloys.

In this embodiment, the base 36d of the triangle is arranged parallel to the integration surface 2202 of the slider substrate 220, i.e., parallel to the track width direction, while a pointed end part 36c opposing the base 36d is arranged closer to the main magnetic pole layer 340 of the electromagnetic coil device 34 than is the base 36d. Specifically, the pointed end part 36c is arranged so as to oppose the leading edge of the main magnetic pole layer 340. A preferred mode of the near-field light generating part 36 is an isosceles triangle in which two base angles at both ends of the base 36d are equal to each other.

The height H36 of the triangle of the near-field light generating part 36 is sufficiently smaller than the wavelength of the incident laser light and is preferably 20 to 400 nm. The width W36 of the base 36 is sufficiently smaller than the wavelength of the incident laser light and is preferably 20 to 400 nm. The vertex angle providing the pointed end 36c is 60°, for example.

The thickness of the near-field light generating part 36 is preferably 10 to 100 nm. The core layer 35, near-field light generating part 36, and the like can easily be formed by using a photolithography technique such as liftoff.

When the near-field light generating part 36 is irradiated with light from the laser diode 40, near-field light is mainly generated from the pointed part 36c. This seems to be because, when the near-field light generating part 36 is irradiated with light, electrons within a metal constituting the near-field light generating part 36 vibrate plasmatically, whereby electric fields concentrate at its leading end part.

Though dependent on the wavelength of incident laser light and the form of the core layer 35, the near-field light generated from the near-field light generating part 36 has the highest intensity at boundaries of the near-field light generating part 36 as seen from the medium-opposing surface S in general. Therefore, the strongest radiation of near-field light occurs in the vicinity of the leading end 361c, for example. That is, in a thermally assisted action for heating the recording layer part of the magnetic disk with light the part opposing the leading end 361c and its vicinity becomes a main part for the heating action. The electric field intensity of the near-field light is incommensurably stronger than that of incident light. This very strong near-field light can rapidly heat its opposing local part of the magnetic disk surface.

Light Source Unit

Figure 6:
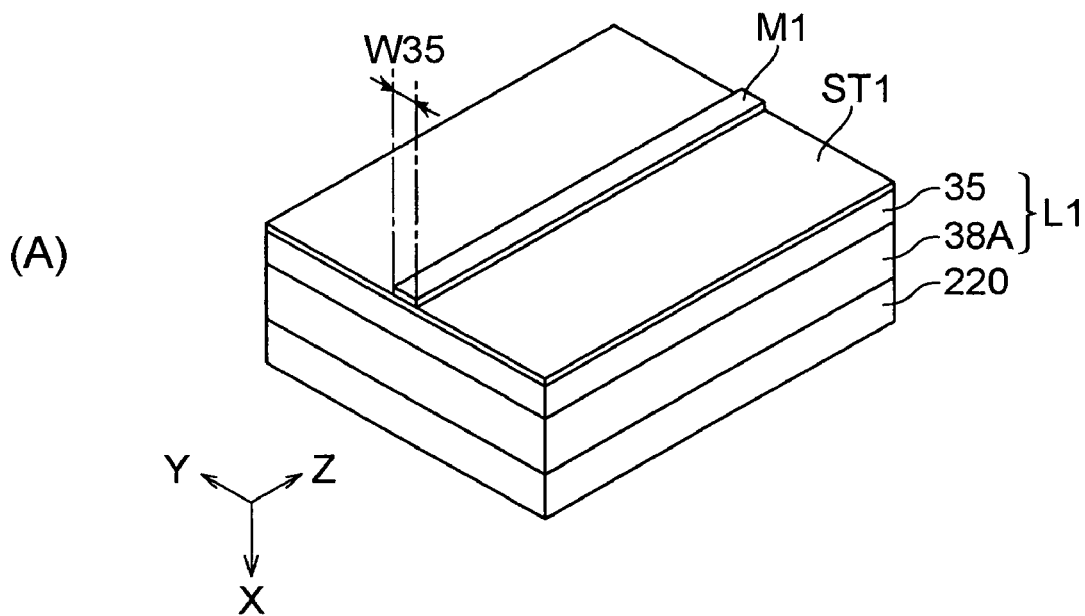
FIGS. 6(A) and 6(B) are perspective views of respective thermally assisted magnetic head intermediates for explaining a method of manufacturing a thermally assisted magnetic head in this order.
Figure 6:
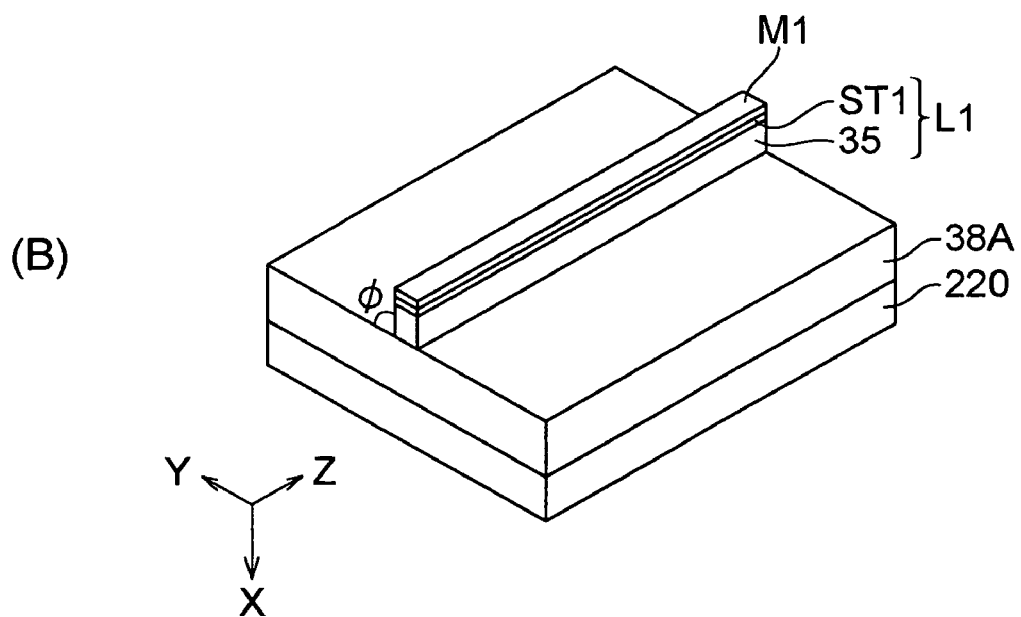

With reference to FIGS. 3, 4, and 6, constituents of the light source unit 23 of the thermally assisted magnetic head 21 will now be explained. The light source unit 23 mainly comprises the light source supporting substrate 230 and the planar laser diode (light source) 40 having a planar outer shape.

The light source supporting substrate 230 is a substrate made of AlTiC ($Al_2O_3$—TiC) or the like and has the bonding surface 2300 attached to the rear face 2201 of the slider substrate 220 as shown in FIG. 4. The bonding surface 2300 is preferably formed with a heat insulating layer 230a made of alumina or the like.

An insulating layer 41 formed from an insulating material such as alumina is provided on a device forming surface 2302 which is one of side faces when the bonding surface 2300 is defined as the bottom face. As shown in FIG. 3, the electrode pads 47, 48 are formed on the insulating layer 41, while the laser diode 40 is secured onto the electrode pad 47. Though not restricted in particular, the material for the insulating layer 41 is preferably an electrically insulating material having a high thermal conductivity, examples of which include AlN, diamond-like carbon, and SiC.

As shown in FIG. 4, the electrode pad 47 is electrically connected to the light source supporting substrate 230 through a via hole 47a provided in the insulating layer 41. The electrode pad 47 also functions as a heatsink for dissipating the heat toward the light source supporting substrate 230 through the via hole 47a at the time of driving the laser diode 40. Since the electrode pad 47 is electrically connected to the light source supporting substrate 230, the potential of the light source supporting substrate 230 can be regulated to the ground potential, for example, by the electrode pad 247.

As shown in FIG. 3, the electrode pad 47 is formed at the center part of a surface 411 of the insulating layer 41 such as to extend in the track width direction. On the other hand, the electrode pad 48 is formed at a position separated in the track width direction from the electrode pad 47. The electrode pads 47, 48 further extend toward the flexure 201 for connection therewith by solder reflow.

Each of the electrode pads 47, 48 may be formed, for example, by a layer of Au, Cu, or the like having a thickness onto the order of 1 to 3 μm formed by vacuum deposition, sputtering, or the like by way of a foundation layer made of Ta, Ti, or the like having a thickness of about 10 nm, for example.

The laser diode 40 is electrically connected onto the electrode pad 47 by a solder layer 42 (see FIG. 4) made of a conductive solder material such as Au—Sn. In this embodiment, the laser diode 40 is a so-called edge-emitting laser diode. The structure of the laser diode 40 is not restricted in particular. For example, a laser diode having an active layer made of a multiple quantum well (e.g., InGaP/InGaAlP or GaAl/GaAlAs) or the like can be used. Such a laser diode 400 emits laser light from a light exit end 400 when a voltage is applied. The method of securing the laser diode 40 is not limited in particular. For example, the bottom face of the light source supporting substrate 230 can be provided with a groove in which the laser diode 40 is placed, or a semiconductor material may directly be grown epitaxially on the substrate.

As for the wavelength $\lambda_L$ of the laser light to be irradiated, a laser light adapted to emit laser light having the appropriate wavelength $\lambda_L$ is selected in view of the form and metal material of the near-field light generating part 36 and the refractive index n of the material constituting the core layer 35.

An electrode surface at one end of the laser diode 40 is secured to the electrode pad 47 by the solder layer 42 of AuSn or the like (see FIG. 4). Here, the laser diode 40 is secured to the light source supporting substrate 230 such that the light exit end (light exit surface) 400 of the laser diode 40 faces down (in the –Z direction) in FIG. 4, i.e., the light exit end is parallel to the bonding surface 2300, whereby the light exit end 400 opposes the light entrance surface 354 of the core layer 35 in the slider 22. For securing the laser diode 40, for example, after a vapor deposition film of an AuSn alloy having a thickness on the order of 0.7 to 1 μm is formed on the surface of the electrode pad 47, the laser diode 40 is mounted thereon and then heated to a temperature on the order of 200 to 300° C. by a hot plate or the like under a hot air blower.

As shown in FIG. 3, the electrode pad 48 and an electrode surface at the other end of the laser diode 40 are electrically connected to each other by a bonding wire, for example.

The rear face 2201 of the slider 22 and the bonding surface 2300 of the light source unit 23 are bonded to each other by an adhesive layer 44 (see FIG. 4) constituted by a UV-curable adhesive or a solder layer made of AuSn or the like, for example.

The slider 22 and light source unit 23 may have any sizes. For example, the slider 22 may be a so-called femto slider having a width in the track width direction of 700 μm, a length (depth) of 850 μm, and a thickness of 230 μm. In this case, the light source unit 23 may have a width and a length which are substantially the same as those mentioned above.

A spot of a far-field image (far-field pattern) of laser light having reached the light entrance surface 354 of the core layer 35 may have a diameter on the order of 0.5 to 1.0 μm in the track width direction, for example, and a diameter on the order of 1 to 5 μm orthogonal thereto, for example. In conformity thereto, it will be preferred if the core layer 35 receiving this laser light has a thickness T35 (see FIG. 5) on the order of 2 to 10 μm, which is greater than the spot for example, and a width (W35) on the order of 1 to 200 μm, for example.

Electric Connection Between Thermally Assisted Magnetic Head and Flexure

As shown in FIG. 3, one of leads constituting the wiring member 203 is connected to the electrode pad 247, while the electrode pad 247 is connected to the electrode pad 47 of the light source unit 23 through reflow solder R. Another lead is connected to an electrode pad 248, while the electrode pad 248 is connected to the electrode pad 48 of the light source unit 23 through reflow solder R. When a driving current is supplied between the electrode pads 247, 248, the laser light 40 emits light.

Another pair of leads constituting the wiring member 203 are connected to the electrode pads 371 through electrode pads 237 and bonding wires, whereby a voltage can be applied to both ends of the electromagnetic coil device 34 (see FIG. 4 and the like). When the voltage is applied between a pair of electrode pads 371, the electromagnetic coil device 34 as a magnetic recording device is energize whereby a writing magnetic field occurs.

Still another pair of leads constituting the wiring member 203 are connected to the electrode pads 373 through electrode pads 238 and bonding wires, whereby a voltage can be applied to both ends of the MR device 33 (see FIG. 4). When the voltage is applied between a pair of electrode pads 373, a sense current flows through the M device 33. Information written in the recording medium can be read by causing the sense current to flow through the NR device 33.

Operations of the thermally assisted magnetic head 21 in accordance with this embodiment will now be explained.

At the time of a writing or reading action, the thermally assisted magnetic head 21 hydrodynamically floats above the rotating magnetic disk (medium) 10 by a predetermined fly height. At this time, the ends of the MR device 33 and electromagnetic coil device 34 on the medium-opposing surface S side oppose the magnetic disk 10 through a minute spacing, whereby reading by sensing a data signal magnetic field and writing by exerting a data signal magnetic field are performed.

At the time of writing data signals, laser light propagating through the core layer 35 from the light source unit 23 reaches the near-field light generating part 36, whereby the near-field light generating part 36 generates near-field light. This raises the temperature in a predetermined recording area of the magnetic recording medium which opposes the medium-opposing surface) thereby temporarily lowering the coercivity of the recording area. When the electromagnetic coil device 34 is energized during is coercivity-decreasing period, so as to generate a writing magnetic field, information can be written in the recording area.

Employing a thermally assisted magnetic recording scheme enables writing on magnetic disks having a high coercivity with a thin-film magnetic head for perpendicular magnetic recording, so as to attain very fine recording bits, thereby achieving a recording density in the class of 1 Tbits/in$^2$, for example.

Since the distance WWG between the main magnetic pole layer 340 and core layer 35 as seen from the medium-opposing surface shown in FIG. 5 is very small in particular in this embodiment, the main magnetic pole layer 340 can rapidly apply a magnetic field to the recording area of the magnetic recording medium heated by the near-field light generating part 36, thereby enabling efficient writing.

Manufacturing Method

In a method of manufacturing the above-mentioned thermally assisted magnetic head, a method of forming the insulating layer 38 to become the core layer and cladding will now be explained in detail in particular.

FIGS. 6(A) to 7(A) and 8(A) to 9(B) are perspective views of thermally assisted magnetic head intermediates for explaining the method of manufacturing a thermally assisted magnetic head. For clarifying characteristic parts, the other elements existing about the devices illustrated in the perspective views are omitted therefrom. In these drawings, the surface on the left side in front is a surface corresponding to the medium-opposing surface. FIG. 7(B) is an enlarged view of the surface corresponding to the medium-opposing surface in FIG. 7(A).

To begin with, as shown in FIG. 6(A), a first cladding layer 38A to become a part of the insulating layer (cladding layer) 38 is formed on a substrate 220. Subsequently, a core layer 35 is formed on the first cladding layer 38A, and then a first polishing stop layer ST1 is formed on the core layer 35 (first multilayer body forming step). Here, the core layer 35 and first polishing stop layer ST1 construct a first multilayer body L1. These layers can be formed by a known method such as sputtering. The near-field light generating part 36 shown in FIG. 5 is included in the core layer 35 but not depicted in FIG. 6 and later. The near-field light generating part 36 can also be formed by sputtering, photolithography, or the like.

The first polishing stop layer ST1 is a layer formed from a material which is harder to be polished than the core layer 35, i.e., exhibits a polishing rate slower than that of the latter, when removing a part of a second cladding layer 38B by polishing which will be explained later. For example, in the case where CMP is used as a polishing method while a metal oxide such as $Al_2O_3$, $Ta_2O_5$, $Nb_2O_5$, or $TiO_2$ is employed as a material for the core layer 35, a material such as Ta, Ti, TiN, AlN, or Ru may be used for the first polishing stop layer ST1. Though not restricted in particular, the thickness of the first polishing layer ST1 may be on the order of 10 to 100 nm, for example.

Subsequently, a mask M1 having a width W35, for example, made of a resist material is formed on the first polishing layer ST1, and a part of the first multilayer body L1 is removed through the mask M1 as shown in FIG. 6(B), whereby the first multilayer body L1 is patterned (first multilayer body patterning step). This defies the width W35 of the core layer 35 shown in FIGS. 3 to 5. This also exposes the surface of the first cladding layer 38A. The angle φ (see FIG. 6(B)) formed between a side face of the patterned core layer 35 and the first cladding layer 38A may be 90°, less than 90° so that the core layer 35 has an inverted trapezoidal cross with the overhung side face, or more than 90° so that the core layer has a trapezoidal cross-sectional form with the side face tilted to yield a wider base. It will be preferred in particular if φ is at least 70° but not more than 11°.

Next, the mask M1 is preferably removed by a known method. Thereafter, the second cladding layer 38B to become a part of the insulating layer (cladding layer) 38 is formed on the patterned first multilayer body L1 and the first cladding layer 38A exposed on both sides thereof and a second polishing stop layer ST2 is formed on the second cladding layer 38B (second multilayer body forming step). Here, the second cladding layer 38B and second polishing stop layer ST2 construct a second multilayer body L2.

Though not restricted in particular, the thickness T38 of the second cladding layer 38B is preferably at least the thickness T35 of the core layer 35, more preferably more than the thickness T35 of the core layer 35 as shown in FIG. 7B, so as to prevent the first polishing stop layer ST1 from projecting out of the second polishing stop layer ST2 and being polished in excess in a removing step by polishing which will be explained later.

The second polishing stop layer ST2 is a layer formed from a material which is harder to be polished than the second cladding layer 38B, i.e., exhibits a polishing rate slower than that of the latter, when removing a part of the second cladding layer 38B by polishing which will be explained later. For example, in the case where CMP is used as a polishing method while a metal oxide such as $SiO_2$ or $Al_2O_3$ is employed as a material for the second cladding layer 38B, a material such as Ta, T, TiN, AlN, or Ru may be used for the second polishing stop layer ST2. Though not restricted in particular, the thickness of the second polishing layer ST2 may be on the order of 10 to 100 nm, for example. This step forms a projected part L2P of the second multilayer body L2 on the patterned first multilayer body L1 as shown in FIG. 7(B).

Subsequently, the projected part L2P of the second multilayer body L2 is removed by polishing (see FIG. 8(A)). Preferably, a flattening technique using CMP (chemical mechanical polishing) is employed here. The CMP is performed by pressing a rotating polishing pad to a surface to be polished, while supplying this surface with a slurried polishing agent. The polishing agent contains fine particles of alumina, silica, or the like for a mechanical polishing action and an oxidizing agent for a chemical polishing action, whereby the CMP carries out mechanical and chemical polishing actions.

Since the projected part L2P of the second multilayer body L2 projects out of the remaining part as shown in FIG. 7(B) in this removing step, the second polishing stop layer ST2 can easily be removed by concentrating stresses and the like even when the projected part L2P is covered therewith; whereby the second cladding layer 38B of the projected part L2P is also removed by polishing, thus yielding a state with a flattened surface as shown in FIG. 8(A). Since the surface of the core layer 35 is covered with the first polishing stop layer ST1 here, the second cladding layer 38B on the first polishing stop layer ST1 can be polished to a thickness of zero without polishing the core layer 35. Since the second cladding layer 38B located about the core layer 35 is covered with the second polishing stop layer ST2, the thickness of the second cladding layer 38B located about the core layer 35 can be maintained easily.

Figure 7:
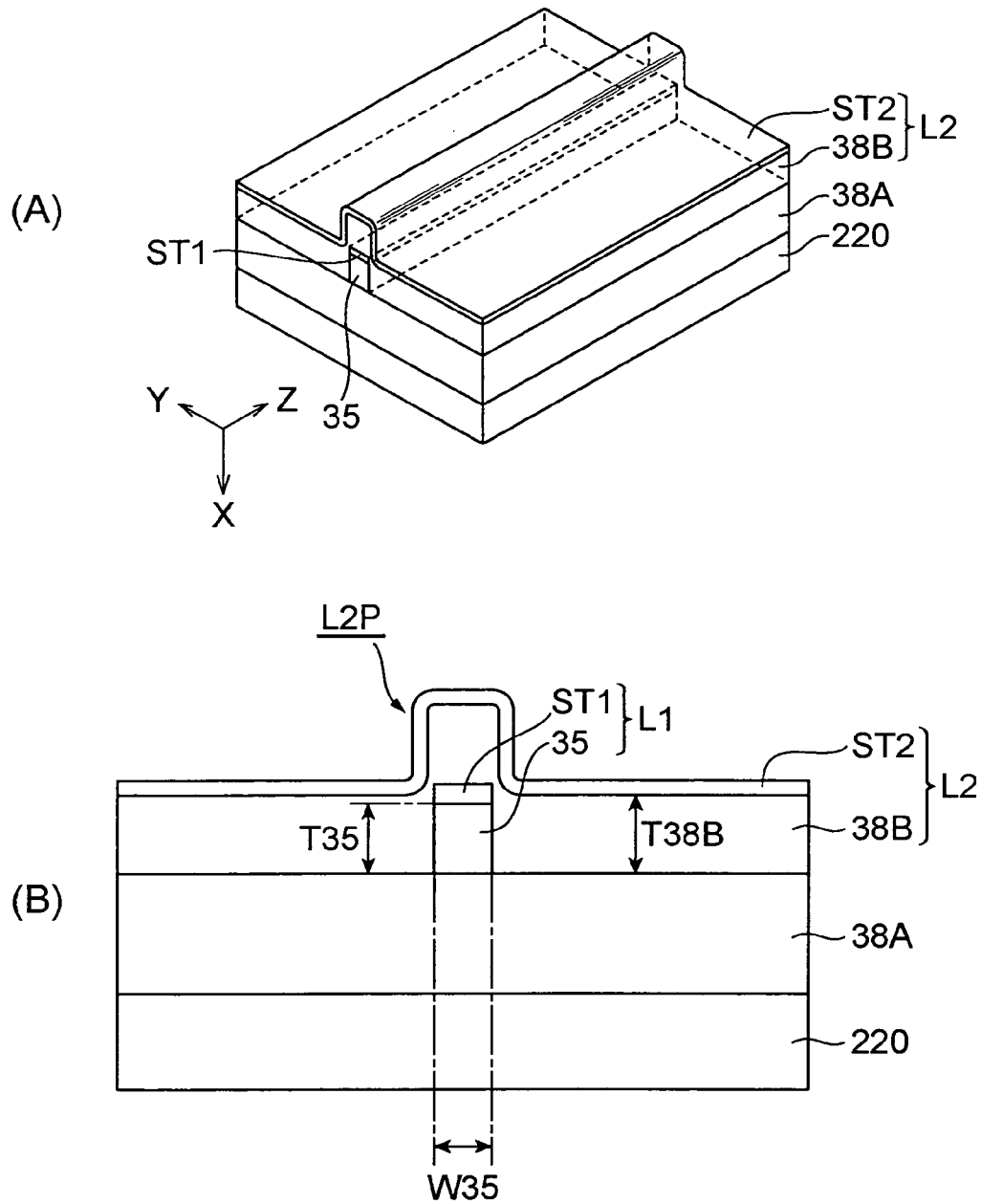
FIG. 7(A) is a perspective view of a thermally assisted magnetic head intermediate subsequent to that of FIG. 6(A)
FIG. 7(B) is an enlarged view of the medium-opposing surface in FIG. 7(A)
Figure 8:
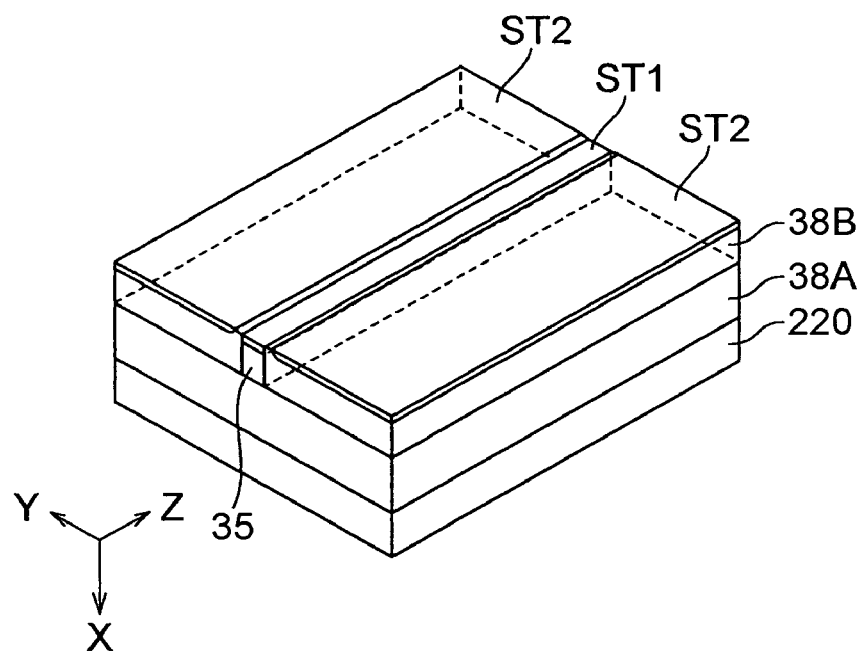
FIGS. 8(A) and 8(B) are perspective views of respective thermally assisted magnetic head intermediates subsequent to that of FIG. 7(A) for explaining the method of manufacturing a thermally assisted magnetic head in this order.
Figure 8:
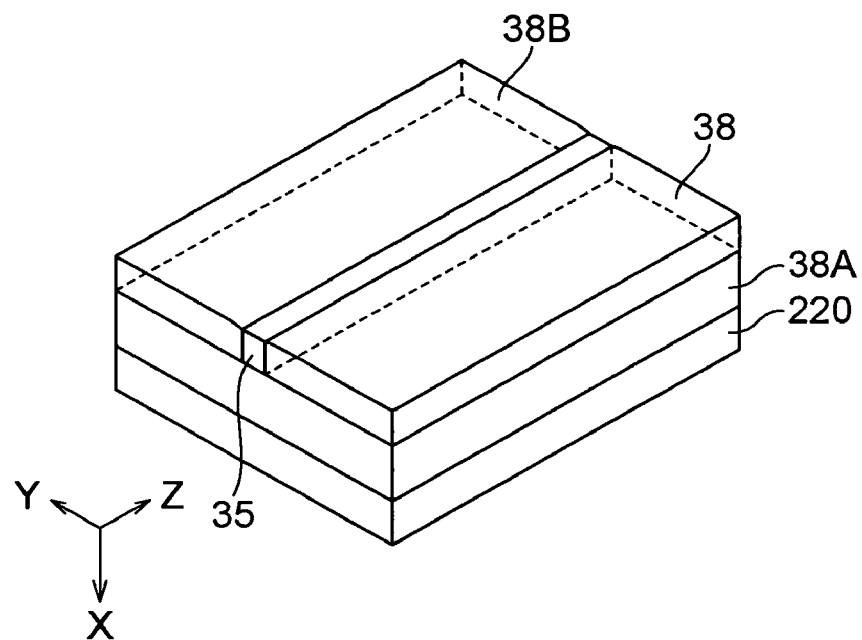

For efficiently removing the projected part L2P of FIG. 7, it will be preferred if the width W35 of the core layer 35 is made sufficiently thin, e.g., 10 μm or less, and the area of the core layer 35 in a slider state as seen in the X direction of FIG. 3 has been set beforehand to 10% or less of that of the slider substrate 220.

Next, the first and second polishing stop layers ST1, ST2 are removed (see FIG. 8(B)). Even after removing the first and second polishing stop layers ST1, ST2, the surface of the core layer 35 attains a sufficiently flattened state relative to its thickness T35. The removing method is not restricted in particular. For example, known dry etching methods such as ion milling and reactive ion etching may be used. Depending on the materials of the first and second polishing stop layers ST1, ST2, the present invention can be carried out without removing them.

Subsequently, as shown in FIG. 9(A), a third cladding layer 38C to become a part of the insulating layer (cladding layer) 38 is formed on the core layer 35 and second cladding layer 38B. The thickness of the third cladding layer 38C may be 0.05 to 0.5 nm, for example. Preferably, a method which can easily control a fine film thickness is used for forming the third cladding layer 38C. When forming a metal oxide, sputtering is preferably used in particular.

Though materials having the same refractive index are preferably used for the first, second, and third cladding layers 38A, 38B, 38C and the like constituting the insulating layer 38, it can also be realized by a multilayer structure using different materials.

Next, as shown in FIG. 9(B), a main magnetic pole layer 340 is formed on the third cladding layer 38C by a known method such as photolithography. Then, a coil layer and the like which are not depicted are further formed so as to complete an electromagnetic coil device, and an insulating layer which is made of a dielectric material similar to that of the third cladding layer 38B, for example, and becomes a part of the insulating layer is formed as an overcoat layer. Thereafter, known steps such as wrapping of the medium-opposing surface are carried out, whereby the slider 22 is completed. When the third cladding layer 38C is substantially flat, the width of the main magnetic pole in the Y direction is easy to control.

As compared with the part of the second multilayer body L2 formed about the first multilayer body L1, the projected part L2P (see FIG. 7B)) of the second multilayer body L2 relatively projects out at the time of executing the removing step and thus can easily be removed by this step in the present invention. When polishing, the projected part L2P of the second multilayer body L2, the first polishing stop layer ST1 in the first multilayer body L1 restrains the core layer 35 from being polished, which makes it easy for the thickness of the second cladding layer 38B on the core layer 35 to become zero without polishing the core layer 35. As a consequence, even when a number of devices are formed at once on the substrate 220, it becomes easier for the thickness of the second cladding layer 38B in each device to become zero without polishing the core layer 35.

Figure 9:
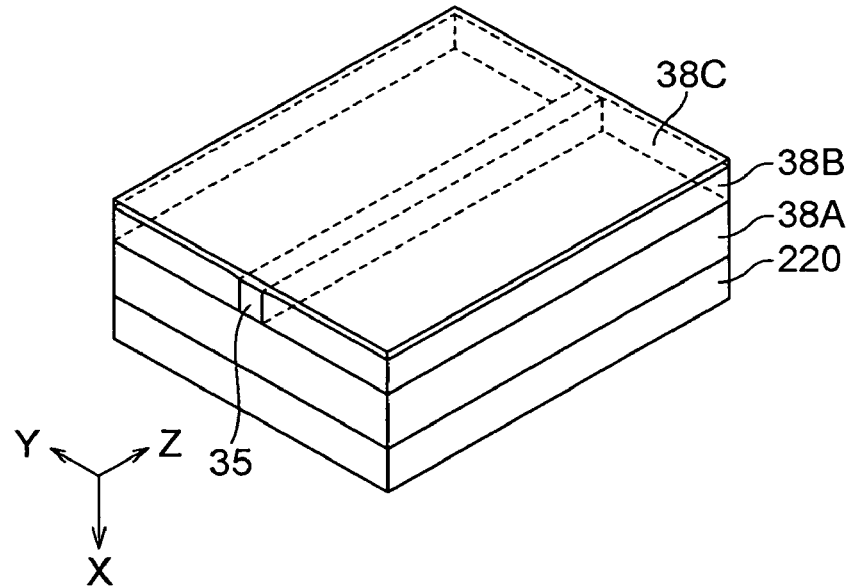
FIGS. 9(A) and 9(B) are perspective views of respective thermally assisted magnetic head intermediates subsequent to that of FIG. 8(B) for explaining the method of manufacturing a thermally assisted magnetic head in this order.
Figure 9:
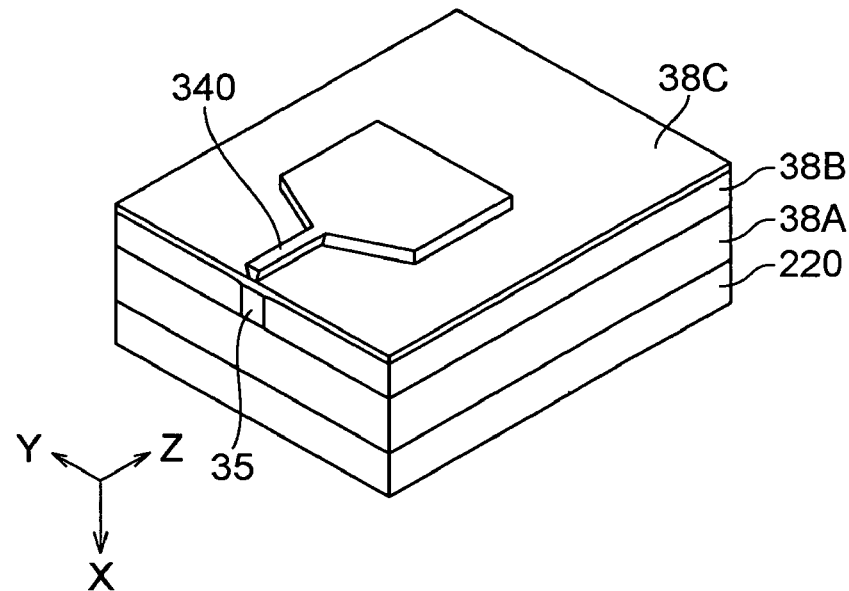

Since the part of the second cladding layer 38B located about the core layer 35 is covered with the second polishing stop layer ST2 at the time of the removing step by polishing, the part of the second cladding layer 38B located about the core layer 35 is restrained from being unnecessarily polished which makes it easy to keep the thickness T38 in the part of the second cladding layer 38B located about the core layer 35 at a desirable thickness. Therefore, after the removing step, the relatively flat cladding layer 38C can be formed with a predetermined minute thickness on the core layer 35 and the second cladding layer 38B located thereabout as shown in FIG. 9 without further polishing steps. Forming the main magnetic pole layer 340 on the third cladding layer 38C can make the distance WWG between the core layer 35 and main magnetic pole layer 340 shorter than that conventionally available. Even when a number of magnetic head parts are manufactured by the same process, the distance WWG between the core layer 35 and main magnetic pole layer 340 can easily be controlled so as to fail within a predetermined range while suppressing its fluctuations among a plurality of magnetic head parts.

When the thickness T38B of the second cladding layer (see FIG. 7(B)) is at least the thickness T35 of the core layer 35 in the first multilayer body L1, preferably more than T35, the lower face of the second polishing stop layer ST2 is at least as high as the upper face of the core layer 35, preferably higher than the upper face thereof, whereby the second polishing stop layer ST2 can also restrain the core layer 35 from being polished. Since the polishing stop layer ST1 exists, the present invention can also be realized when the thickness T38B of the second cladding layer is less than the thickness T35 of the core layer 35 in the first multilayer body L1.

Without being restricted to the above-mentioned embodiments, the present invention can be modified in various ways.

For example, though the above-mentioned embodiments employ a laser diode as the light source, the present invention can be realized with other light-emitting devices such as LED.

The electromagnetic coil device 34 may be one for longitudinal magnetic recording. In this case, lower and upper magnetic pole layers are provided in place of the main magnetic pole layer 340 and auxiliary magnetic pole layer 344, and a write gap layer is held between respective ends of the lower and upper magnetic pole layers on the medium-opposing surface S side. Writing is carried out by leakage magnetic fields from the writing gap layer position.

The form of the near-field light generating part is not limited to the one mentioned above, but can be modified in various ways. For example, it may have a so-called "bow-tie" structure in which a pair of triangular or trapezoidal plates are opposed to each other with their vertexes or shorter sides being spaced by a predetermined distance from each other. The near-field light generating part may be a minute opening instead of a plate. The present invention can also be realized in a mode in which laser light impinges on a recording medium through the core layer without providing the near-field light generating part. Though the leading end portion 36c of the near-field light generating part is oriented in the direction of the main magnetic pole layer 340 (−X direction), it may be oriented in ±Y directions.

Though a linear core layer is used as the core layer 35, it may be a parabolic core layer whose outer shape within the YZ plane forms a parabola while the near-field light generating part is arranged at a focal position thereof. The outer shape within the YZ plane may be an elliptical form or a taper form whose leading end closer to the medium becomes thinner. In a hard disk drive equipped with the above-mentioned thermally assisted magnetic head and HGA, writing errors due to insufficient heating of the recording medium dug writing actions and side erasure are fully prevented from occurring.

The thermally assisted magnetic heads are roughly classified into those of a magnetically dominant recording the and an optically dominant recording type. The magnetically dominant recording scheme employs an electromagnetic coil device as a main part for writing, while the radiation diameter of light is larger than the track width (recording width). On the other hand, the optically dominant recording scheme employs a light radiation part as a main part for writing, while the radiation diameter is substantially the same as the track width (recording width). That is, the magnetically dominant recording scheme provides a magnetic field with a spatial resolution, whereas the optically dominant recording scheme provides light with a spatial resolution. The present invention is applicable to manufacturing any type of thermally assisted magnetic heads.

All the embodiments described above illustrate but do not limit the present invention, so that the present invention can be carried out in various other modified and altered modes. Therefore, the scope of the present invention is defined only by the scope of claims and their equivalents.

What is claimed is:
1. A method of manufacturing a thermally assisted magnetic head, the method comprising:
   a first multilayer body forming step of forming a first multilayer body on a first cladding layer, the first cladding layer consisting of a light-transmissive dielectric material, the first multilayer body including a core layer consisting of a light-transmissive dielectric material and a first polishing stop layer in order from the first cladding layer side;

a first multilayer body patterning step of patterning the first multilayer body, so as to expose the first cladding layer about the patterned first multilayer body;

a second multilayer body forming step of forming a second multilayer body on the exposed first cladding layer and patterned first multilayer body, the second multilayer body including a second cladding layer consisting of a light-transmissive dielectric material and a second polishing stop layer in order from the first cladding layer side; and a removing step of polishing away a part of the second multilayer body formed on the first multilayer body.

2. A method of manufacturing a thermally assisted magnetic head according to claim 1, wherein, in the second multilayer body forming step, the second cladding layer has a thickness not smaller than that of the core layer in the first multilayer body.

3. A method of manufacturing a thermally assisted magnetic head according to claim 1, further comprising the step of removing the first and second polishing stop layers and forming a third cladding layer on the core layer and second cladding layer after the removing step.

4. A method of manufacturing a thermally assisted magnetic head according to claim 1, wherein the material of the core layer has a refractive index higher than that of the material forming the first cladding layer.

* * * * *